United States Patent [19]
Perkins et al.

[11] Patent Number: 5,963,549
[45] Date of Patent: Oct. 5, 1999

[54] FIXED WIRELESS LOOP SYSTEM HAVING BASEBAND COMBINER PREDISTORTION SUMMING TABLE

[75] Inventors: Steven B Perkins, Sandy; L Andrew Gibson, Jr., Riverton; Ronald B Arthur, Provo; Lee A Butterfield, West Jordan, all of Utah

[73] Assignee: L-3 Communications Corporation, New York, N.Y.

[21] Appl. No.: 08/988,050

[22] Filed: Dec. 10, 1997

[51] Int. Cl.[6] .................................................. H04J 13/00
[52] U.S. Cl. ..................... 370/342; 370/206; 370/335; 375/261; 375/296
[58] Field of Search ..................................... 370/342, 206, 370/320, 335, 345, 336; 375/206, 216, 229, 261, 296, 322

[56] References Cited

U.S. PATENT DOCUMENTS

| | | | |
|---|---|---|---|
| 5,008,900 | 4/1991 | Critchlow et al. | 375/229 |
| 5,414,728 | 5/1995 | Zehavi | 370/206 |
| 5,499,236 | 3/1996 | Giallorenzi et al. | 370/18 |
| 5,583,853 | 12/1996 | Giallorenzi et al. | 370/441 |
| 5,812,607 | 9/1998 | Hutchinson, IV et al. | 375/322 |

*Primary Examiner*—Douglas W. Olms
*Assistant Examiner*—Shick Hom
*Attorney, Agent, or Firm*—Perman & Green, LLP

[57] ABSTRACT

Disclosed is a method for generating I/Q waveforms for transmission over a CDMA radio channel. The method includes steps of (a) summing, for each of a plurality N of channels, the state of I bits to form an Isum value having a sign bit, the state of Q bits to form a Qsum value having a sign bit, and a total number of active channels to form a channel sum value; (b) applying the Isum value and sign bit, the Qsum value and sign bit, and the channel sum value to an input of a multiplexer; and (c) time multiplexing the inputs to generate first and second sets of output bits. The first set of output bits includes a subset of the Isum value bits, a subset of the Qsum value bits, the I sign bit, and the channel sum value bits. The second set of output bits includes the subset of the Isum value bits, the subset of the Qsum value bits, the Q sign bit, and the channel sum value bits. A next step of the method sequentially applies the first and second sets of output bits to a lookup table memory device for sequentially outputting an I value and a Q value for application to a digital to analog converter for generating I/Q waveforms that are predetermined to reduce transmission power and distortion. In the preferred embodiment of this invention the lookup table memory uses the LSB of the channel sum value as the LSB of the I value and the LSB of the Q value.

10 Claims, 7 Drawing Sheets

FIXED WIRELESS LOOP SYSTEM HAVING BASEBAND COMBINER PREDISTORTION SUMMING TABLE

FIELD OF THE INVENTION

This invention relates generally to wireless local loop systems and, in particular, a fixed wireless loop system providing voice and data communications between a radio base unit and a plurality of subscriber stations.

BACKGROUND OF THE INVENTION

Local loop by traditional definition is that portion of a network that connects a subscriber's home to a central office switch. This is, however, an expansive definition that does not hold true as the network extends into the local loop by means of Digital Loop Carrier and Digital Cross Connects. For the purposes of this invention, local loop is considered as the connection from the subscriber's premises to the connecting point in the network, whatever the nature of that connection may be.

Until recently the local loop was mostly based on copper plant supplemented by microwave radio links for remote areas or difficult terrain. Over the last decade fiber optics have made significant inroads into the local loop (also referred to as "access" network) reaching closer to subscriber homes and buildings. Sonet based access networks bring fiber to the curb. These fiber based solutions can provide very high bandwidth services, reliably and cost-effectively, in urban/metropolitan areas with significant number of business customers. In fact, most access providers in the U.S. have used such fiber based plant to provide access services to U.S. business customers.

The copper and fiber based solutions, while economical in many situations, still suffer from a number of drawbacks.

For example, in an area without an existing network infrastructure, it is very time consuming and expensive to build a new network. The expense is primarily in the labor, rights acquisition (for right of way or easement), and in electronics (for fiber based access). Overall the process is very slow due to extensive effort involved in acquiring right of way and in performing the required construction, aerial and/or underground. Also, in locations with extensive but congested existing infrastructure, it is often very expensive to add capacity due to already full ducts and cables, and sometimes impossible to add capacity without resorting to upgrading the entire system. In addition, wireline solutions tend to have costs that are distance sensitive, hence they are inherently unsuitable for sparse/scattered demand. Wireline networks are also not amenable to redeployment, which results in stranded assets when demand (consumer) moves. Wireline networks also cannot be rapidly deployed in emergency situations.

The term "fixed wireless loop", or FWL, connotes a fixed wireless based local access. However, it is often mixed with limited mobility solutions under the broader term "Radio Access". Irrespective of the type of radio technology, all fixed wireless or radio access systems use wireless means to provide network access to the subscriber. Broadly speaking, there are three main categories of fixed wireless solutions.

Fixed cellular systems are primarily based on existing analog cellular systems like AMPS (in North America) or NMT (in Nordic countries).

Fixed cordless systems are primarily based on the European DECT standard using digital TDMA Time Division Duplex technology.

Bespoke systems are designed specifically for fixed wireless application. Conventional systems in this category are the analog microwave point to multi-point systems. More recently deployed systems operate at higher frequencies and employ digital technologies. These systems may be derived from similar cellular technologies, but are not based on any existing agreed standards.

Of the three main categories of fixed wireless systems there is no one solution that is clearly superior to others. If the primary need for a system operator is to provide voice oriented service wherein voice quality is not a limiting factor, then often a fixed cellular system is adequate, and even desirable because of its relatively low equipment cost. For very high density urban situations, a DECT solution may be desirable due to its high load carrying capacity and its pico-cellular architecture. Microwave solutions are best for sparse populations. Bespoke systems function well over a wide range of situations and have the best overall quality and desirable features, however they are likely to be more expensive, at least in the near future.

Most residential consumers in developing economies are mainly interested in adequate voice service. However, most business customers require data and fax service in addition to voice. With the growing popularity of home computers and Internet access, a need is arising to provide residential consumers with high speed data services at home. As such, the general trend is in the direction that all customers, both residential and business, will demand high quality voice and data services.

A problem that arises in a Code Division Multiple Access (CDMA) digital communication system relates to distortion caused when Inphase (I) and Quadrature (Q) signals are summed for multiple user channels. In order to reduce power requirements it is known to smoothly predistort and/or clip the summed signal, prior to transmission, using a lookup table memory technique. However, conventional approaches that are known to the inventors require a large number of memory address inputs and thus a large capacity lookup table memory. For a communication system that serves a non-trivial number of users the resulting size of the lookup table memory can become impractical and/or can add significant cost to the system.

OBJECTS AND ADVANTAGES OF THE INVENTION

It is a thus a first object and advantage of this invention to provide an improved fixed wireless loop system that fulfills the foregoing and other needs and requirements.

It is a further object and advantage of this invention to provide a CDMA communications system that features an improved predistortion lookup table memory and associated circuitry that reduces a required number of address inputs to the memory, thus also significantly reducing the required memory capacity.

SUMMARY OF THE INVENTION

The foregoing and other problems are overcome and the objects of the invention are realized by methods and apparatus in accordance with embodiments of this invention.

Disclosed is a method for generating I/Q waveforms for transmission over a CDMA radio channel. The method includes steps of (a) summing, for each of a plurality N of channels, the state of I bits to form an Isum value having a sign bit, the state of Q bits to form a Qsum value having a sign bit, and a total number of active channels to form a channel sum value; (b) applying the Isum value and sign bit, the Qsum value and sign bit, and the channel sum value to an input of a multiplexer; and (c) time multiplexing the inputs to generate first and second sets of output bits. The first set of output bits includes a subset of the Isum value bits, a subset of the Qsum value bits, the I sign bit, and the channel sum value bits. The second set of output bits includes the subset of the Isum value bits, the subset of the Qsum value bits, the Q sign bit, and the channel sum value bits. A next step of the method sequentially applies the first and second sets of output bits to a lookup table memory device for sequentially outputting an I value and a Q value for application to a digital to analog converter for generating I/Q waveforms that are predetermined to reduce transmission power and distortion. In the preferred embodiment of this invention the lookup table memory uses the LSB of the channel sum value as the LSB of the I value and the LSB of the Q value.

In a second embodiment of this invention the I and Q sign bits are not applied to the lookup table memory device, but are instead routed from the output of the multiplexer directly to the output of the lookup table memory, thereby further reducing the number of address bits required by the memory, as well as the overall required memory capacity.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
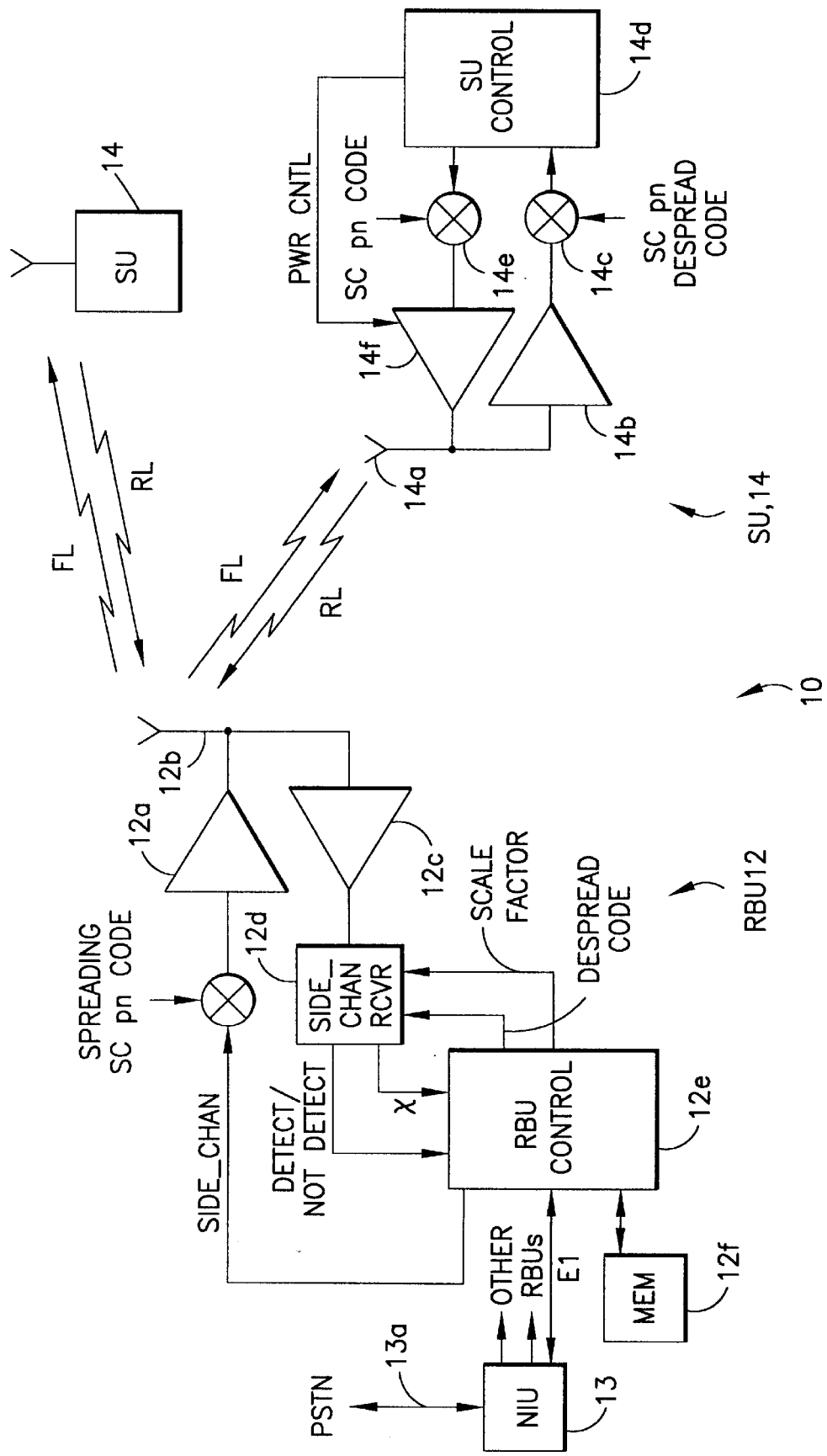
FIG. 1 is a simplified block diagram of a synchronous, DS-CDMA fixed wireless communications system in accordance with this invention, the system having a radio base unit (RBU) and a plurality of transceiver or subscriber units (SUs). The RBU transmits a side channel to the SUs, and also receives an essentially asynchronously transmitted side channel from the SUs.

By way of introduction, and referring to FIG. 1, a Fixed Wireless System (FWS) 10 in accordance with a preferred embodiment of this invention is a bespoke system based on digital radio technology. Specifically, the FWS 10 employs direct sequence spread spectrum based CDMA techniques over an air link to provide local access to subscribers. It offers very high quality, highly reliable service at costs that are very competitive with wireline solutions. The FWS 10 exhibits high spectral efficiency and thus can provide good wireline quality service with limited available bandwidth. A large dynamic range allows the FWS 10 to be deployable in a pico, micro, or mini cellular architecture meeting specific needs of dense metropolitan, urban, and suburban communities in an economical way.

Some important attributes of the FWS 10 include: wireline voice quality delivered at 32 Kbps; high throughput for data and fax applications with 32/64 Kbps throughput; high service reliability with good tolerance for noise and ingress; secure airlink; and support of enhanced services such as priority/emergency calling, both inbound and outbound.

The FWS 10 has a three to five times capacity advantage over conventional asynchronous CDMA technologies, and a three to seven times capacity advantage over currently available Time Division Multiple Access (TDMA) technology, due to its ability to use a frequency reuse of one.

The FWS 10 is a synchronous CDMA (S-CDMA) communications system wherein forward link (FL) transmissions from a radio base unit (RBU) 12 for a plurality of transceiver units, referred to herein as user or subscriber units (SUs) 14, are symbol and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU 12, and to generally perform bidirectional communications. The FWS 10 is suitable for use in implementing a telecommunications system that conveys voice and/or data between the RBU 12 and the SUs 14.

The SU 14 forms a portion of a Customer Premises Equipment (CPE). The CPE also includes a Network Termination Unit (NTU) and an Uninterruptible Power Supply (UPS), which are not illustrated in FIG. 1.

The RBU 12 includes circuitry for generating a plurality of user signals (USER_1 to USER_n), which are not shown in FIG. 1, and a synchronous side channel (SIDE_CHAN) signal that is continuously transmitted. Each of these signals is assigned a respective pn spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components therefrom. The RBU 12 is capable of transmitting a plurality of frequency channels. By example, each frequency channel includes up to 128 code channels, and has a center frequency in the range of 2 GHz to 3 GHz.

The RBU 12 also includes a receiver 12c having an output coupled to a side channel receiver 12d. The side channel receiver 12d receives as inputs the spread signal from the receiver 12c, a scale factor signal, and a side channel despread pn code. These latter two signals are sourced from a RBU processor or controller 12e. The scale factor signal can be fixed, or can be made adaptive as a function of the number of SUs 14 that are transmitting on the reverse channel. The side channel receiver 12d outputs a detect/not detect signal to the RBU controller 12e for indicating a detection of a transmission from one of the SUs 14, and also outputs a power estimate value X, as described below. A read/write memory (MEM) 12f is bidirectionally coupled to the RBU controller 12e for storing system parameters and other information, such as SU timing phase information and power estimate values.

A Network Interface Unit (NIU) 13 connects the RBU 12 to the public network, such as the public switched telephone network (PSTN) 13a, through analog or digital trunks that are suitable for use with the local public network. The RBU 12 connects to the NIU 13 using E1 trunks and to its master antenna 12b using a coaxial cable. The SU 14 communicates with the RBU 12 via the radio interface, as described above.

In addition, the FWS 10 has an Element Management System or EMS (not depicted) that provides Operations, Administration, Maintenance, and Provisioning (OAM&P) functions for the NIU 13 and RBU 12. The functioning of the EMS is not germane to an understanding of this invention, and will not be further described in any great detail.

The NIU 13 is the interface to the public network for the system 10. Its primary purpose is to provide the specific protocols and signaling that are required by the public network. These protocols can vary by country as well as by customer, and possibly even by the connecting point in the network.

In a preferred embodiment of this invention the NIU 13 can connect to a maximum of 15 RBUs 12 using one to four E1 connections per RBU 12, with four E1 connections being used for a fully populated RBU 12. In addition, each NIU 13 is sized for up to, by example, 10,000 subscribers. Time Slot 16 on each E1 trunk is used for passing control information between the NIU 13 and the attached RBUs 12, as well as for passing information to and from the controlling EMS. The protocol is based on the HDLC format and optimized to enhance RBU-NIU communication.

Specific functions provided by the NIU 13 include: initialization of the RBU 12; provisioning of dial tone and DTMF to the SUs 14; set up and tear down of voice and data calls; maintenance of Call Detail Record (CDR) data; HDLC Protocol (data link protocol to RBU Link Control Processor); billing system interface; Common Channel Signaling (CCS) for ringing and onhook/offhook detection; glare detection in NIU, RBU, and SU; call priority management; channel reassignment for calls in progress; detection of hook flash to enable plain old telephone service (POTS) and enhanced POTS calling features; 32/64 Kbps rate change initialization; pay phone capability (12/16 KHz tone detection, line reversal); priority and emergency number calling; accommodation of country specific signaling interfaces such as E&M, R1, R2, R2 variants, and C7; and system modularity: analog/digital options for both line side and trunk side.

The normal mode of operation for the SU 14 is a compressed speech mode using ADPCM encoding according to the ITU-T G.721 standard. This toll quality, 32 Kbps service is the default used whenever a non-X.21 channel is established with the RBU 12 (X.21 channels are configured a priori when provisioned by the EMS/NIU). The 32 Kbps channels may be used for voice band data up to 9600 b/s if desired. When the channel rate bumps to 64 Kbps PCM encoded voice/data due to detection of a fax/modem start tone, fax and modem rates of at least 33.6 Kbps are possible.

Figure 2:
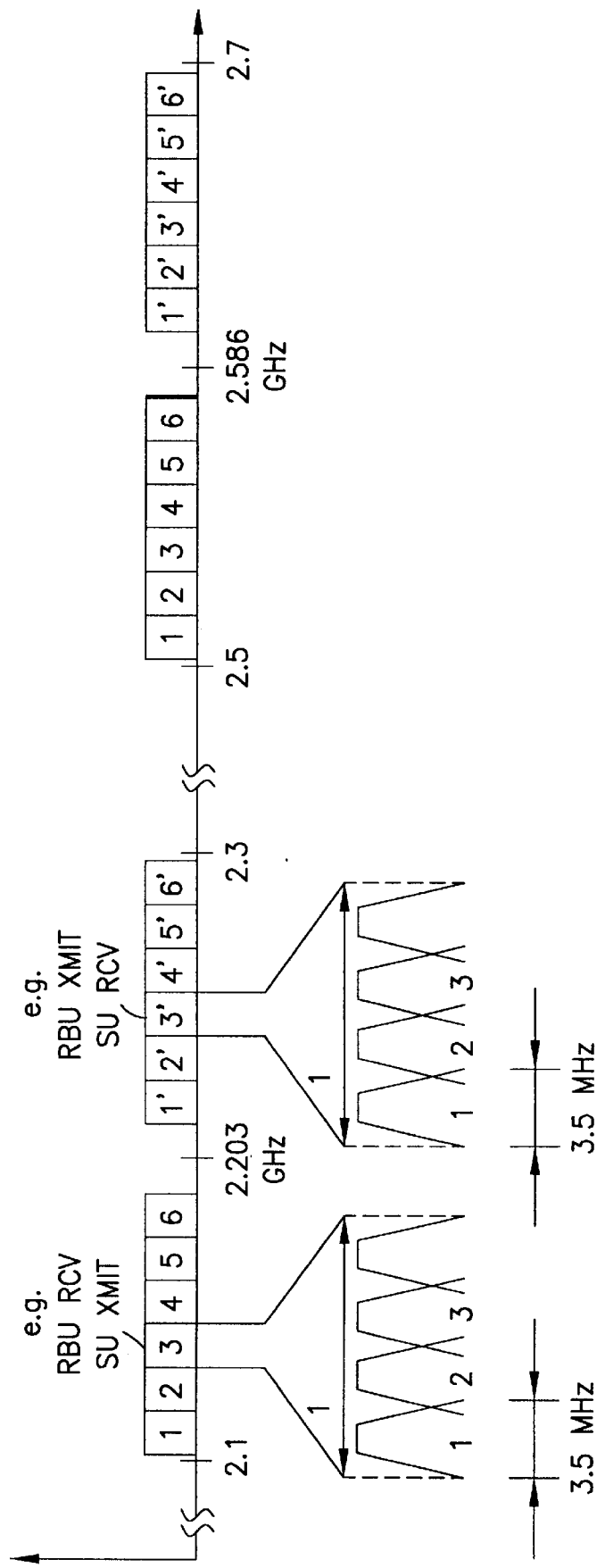
FIG. 2 is an exemplary frequency allocation diagram of the system of FIG. 1.

The SU-RBU air link provides a separate 2.72 MHz (3.5 MHz including guardbands) channel in each direction separated by either 91 MHz or 119 MHz of bandwidth. The nominal spectrum of operation is 2.1–2.3 GHz or 2.5–2.7 GHz. However, the system is designed such that the frequency can be varied from 1.8 to 5 GHz provided the spectral mask and separation between transmit and receive frequencies is maintained as per ITU 283.5 specification. As per the ITU 283.5 specification, there are a total of 96 frequency pairs allowed, as shown in FIG. 2. By example, the RBU 12 may transmit in the 3' frequency band and receive in the 3 frequency band, and the SU 14 transmits in the 3 frequency band and receives in the 3' frequency band.

The RBU 12 can support 128 simultaneous 34 Kbps channels using the 2.72 MHz bandwidth giving it a spectral efficiency of 1.6 bits/Hz. Of this total capacity, 8 channels are used by the FWS 10 and an additional 2 Kbps per channel is system overhead. Thus the effective traffic carrying capacity is 120 channels at 32 Kbps.

The spectral efficiency of the FWS 10 is three to five times that of conventional CDMA systems primarily because the FWS 10 employs bi-directional Synchronous CDMA. Competing systems, including those based on IS-95, are asynchronous or synchronous only in one direction. The bi-directional synchronicity permits the FWS 10 to use near orthogonal spreading codes and gain maximum possible data carrying capacity.

Radio emissions lose energy as they travel in air over long distances. In order to ensure that the received signal energy from a distant subscriber is not completely overwhelmed by that of a near subscriber, the RBU 12 controls the power level of the SUs 14. In the preferred embodiment only the reverse channel power (from SU 14 to the RBU 12) is controlled by the RBU 12. The power control is primarily established at SU 14 initialization.

Subsequent power adjustments are infrequent and are made in response to transient environmental conditions. The closed loop power control is implemented by comparing against a desired power level and making incremental adjustments until the desired level is achieved.

The forward channel power control is not needed since each SU 14 receives its entire signal at only one level. The RBU 12 merely needs to ensure that the received signal strength by the farthest SU 14 is sufficient for its application.

It is not always desirable to have an extended range. In a dense urban or even a suburban setting, one needs to deploy the system in a cellular architecture as depicted below. To reduce interference between sectors and between cells in such a deployment, the range of the RBU is limited overall as well as selectively in specific directions. Such range control may be accomplished using a directional master antenna 12b at the RBU 12, as well by controlling overall RBU power.

When one of the SUs 14 detects an off-hook (the user has picked up the phone), it transmits an outgoing call request on one of six reverse synchronous side channels in a Slotted ALOHA fashion. The side channel is chosen at random. The RBU 12 processes the request and, providing an active channel is available, sends an outgoing call reply to the SU 14 which contains the active channel codes (both forward and reverse). In the meantime, the RBU 12 begins to transmit forward side channel data on the newly activated channel and at a given time, begin to transmit the active call data. The SU 14, which is listening to the forward side channel, receives the active channel assignment and switches at a superframe boundary to the active codes. The SU 14 then begins to receive the side channel data and then the active call data.

When an incoming call is received by the NIU 13 for one of the SUs 14 in the local loop, the RBU 14 is notified over the E1 link. The RBU 12 first checks to determine if the intended SU 14 is busy. If not, the RBU 14 sends a message to the SU 14 on the forward side channel, the message containing the active channel codes. The call processing then continues in the same manner as the outgoing call processing discussed above.

If all channels are busy and the NIU 13 receives an incoming call for a non-busy SU 14, it provides a subscriber busy tone to the caller unless the called SU has priority inbound access (such as a hospital, fire station, or police), in which case the NIU 13 instructs the RBU 12 to drop the least priority call to free up a channel for the called SU 14. Similarly, if an SU 14 initiates a request for service and no traffic channels are open, then the RBU 12 provides the dial tone on a temporary traffic channel and receives the dialed number. If the dialed number is an emergency number the RBU 12 drops a least priority call to free up a traffic channel and connects the free channel to the SU 14. If the called number is not an emergency number then the SU 14 is provided a special busy tone indicating a "wait for service" condition.

Figure 3:
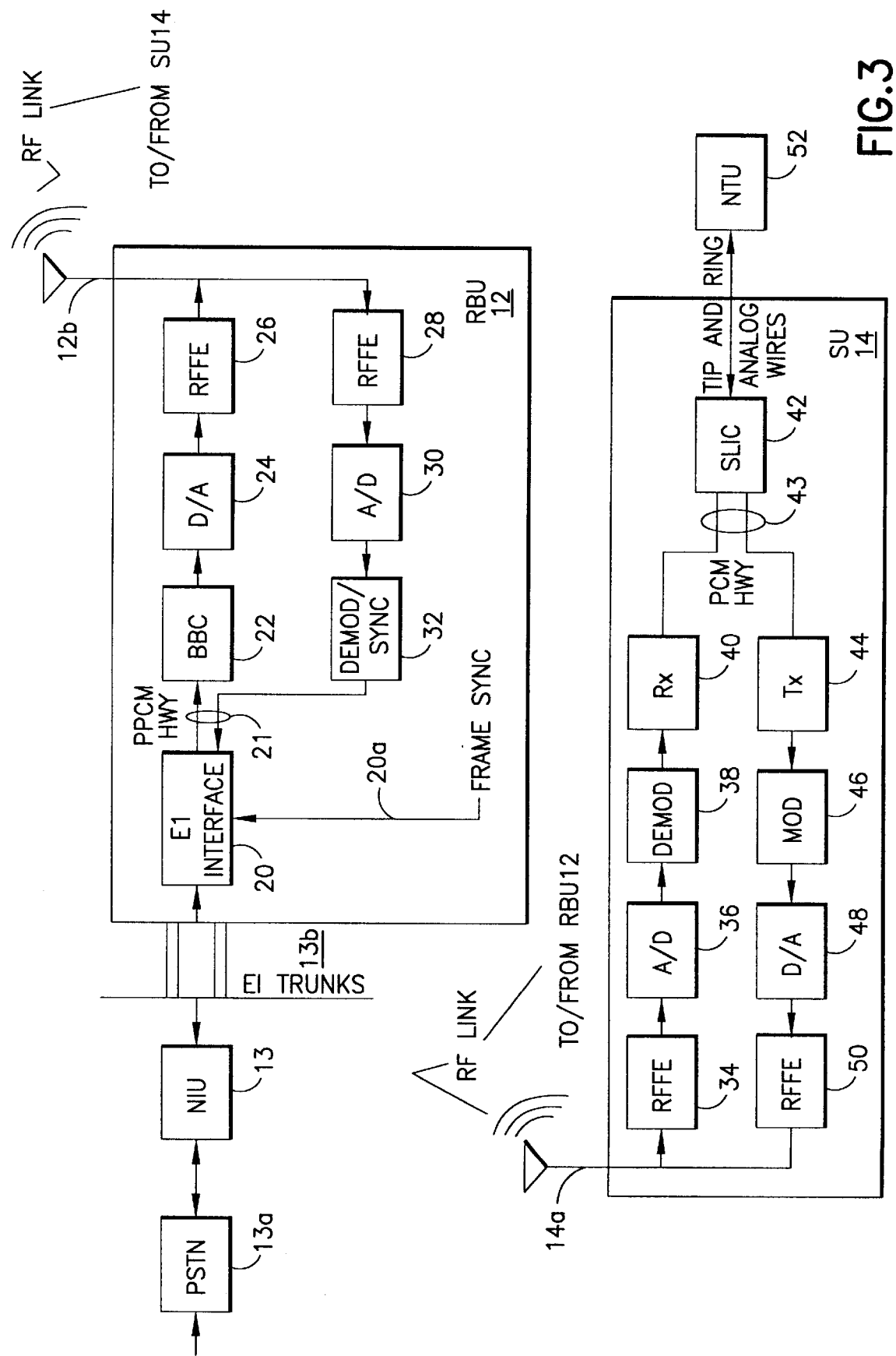
FIG. 3 is a block diagram illustrating the RBU and SU of FIG. 1 in greater detail.

Reference is now made to FIG. 3 for illustrating the RBU 12 and SU 14 in greater detail.

An incoming call from the PSTN 13a passes through the NIU 13 to 64 Kbps per channel E1 trunks 13b and then to a RBU-resident E1 interface 20. The E1 interface 20 optionally performs an A-Law ADPCM algorithm for the compression of the 64 Kbps channel to a 32 Kbps channel that is placed on a PCM highway 21 time slot. If the A-Law ADPCM compression is bypassed, the 64 Kbps channel is split into two 32 Kbps channels and placed onto the PPCM Highway 21. In the preferred embodiment the RBU 12 can accommodate up to 128 32 Kbps channels, and each SU 14 can accommodate up to four 32 Kbps channels. The PPCM Highway 21 operates in conjunction with a frame synchronization (FrameSync) signal 20a, which represents a master timing pulse that is generated every 16 ms. All calls to and from the RBU 12 pass through the PPCM Highway 21 and the E1 interface 20. For the case of an incoming call the signal is applied to a baseband combiner (BBC) 22 and thence to a D/A converter 24 and a transmit radio frequency front-end (RFFE) 26 before being applied to the antenna 12b for transmission to the SU 14. At the SU 14 the incoming call signal is received by the antenna 14a and is applied to a receive RFFE 34, an A/D 36, demodulator 38 and a receiver 40. The SU 14 includes a subscriber line interface circuit (SLIC) 42 that couples a pulse code modulation (PCM) Highway 41 to a network termination unit (NTU) 52. In the reverse direction a call originates at the NTU 52 and passes through the SLIC 42 and PCM Highway 41 to a transmitter 44, modulator 46, D/A converter 48 and a transmit RFFE 50. The signal is applied to the SU antenna 14a and is received by the RBU antenna 12b. The received signal is applied to a receive RFFE 28, A/D converter 30, a demodulator and synchronization unit 32, and then to the PPCM Highway 21 and E1 interface 20 for connection to the PSTN 13a via one of the E1 trunks 13b and the NIU 13.

The RBU 12 controls the master timing for the entire FWS 10. Timing throughout the FWS 10 is referenced to the periodic timing pulse generated at the PPCM Highway 21, i.e., to the FrameSync signal 20a. In the FWS 10 all data is grouped into equal-sized packets referred to as frames, which in turn are grouped into super-frames with, for example, three frames making up one super-frame.

Figure 4A:
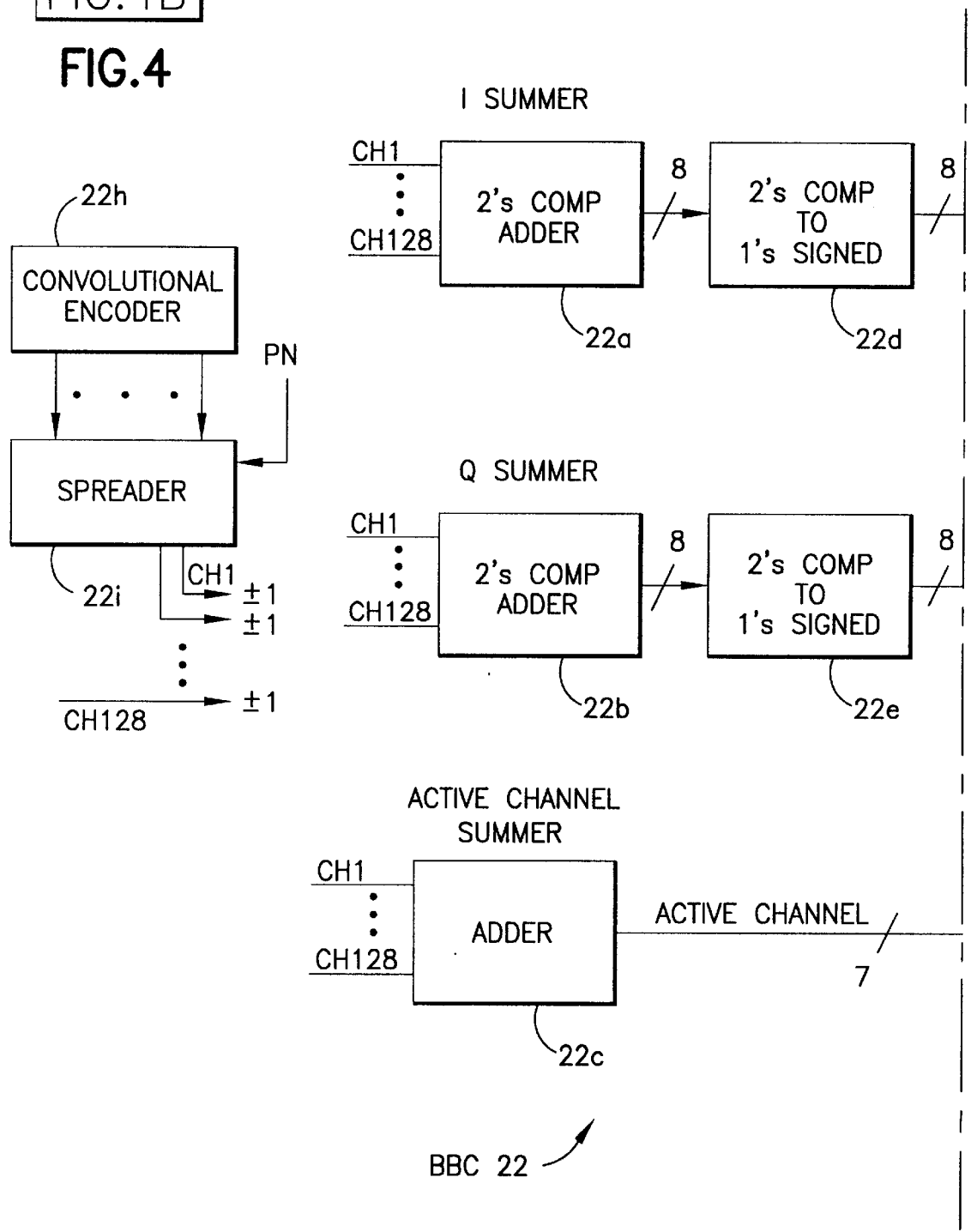
FIG. 4 is a block diagram of a portion of a baseband combiner (BBC) shown in FIG. 3, the block diagram illustrating an embodiment of an improved predistortion lookup table memory and related circuitry in accordance with this invention.
Figure 4B:
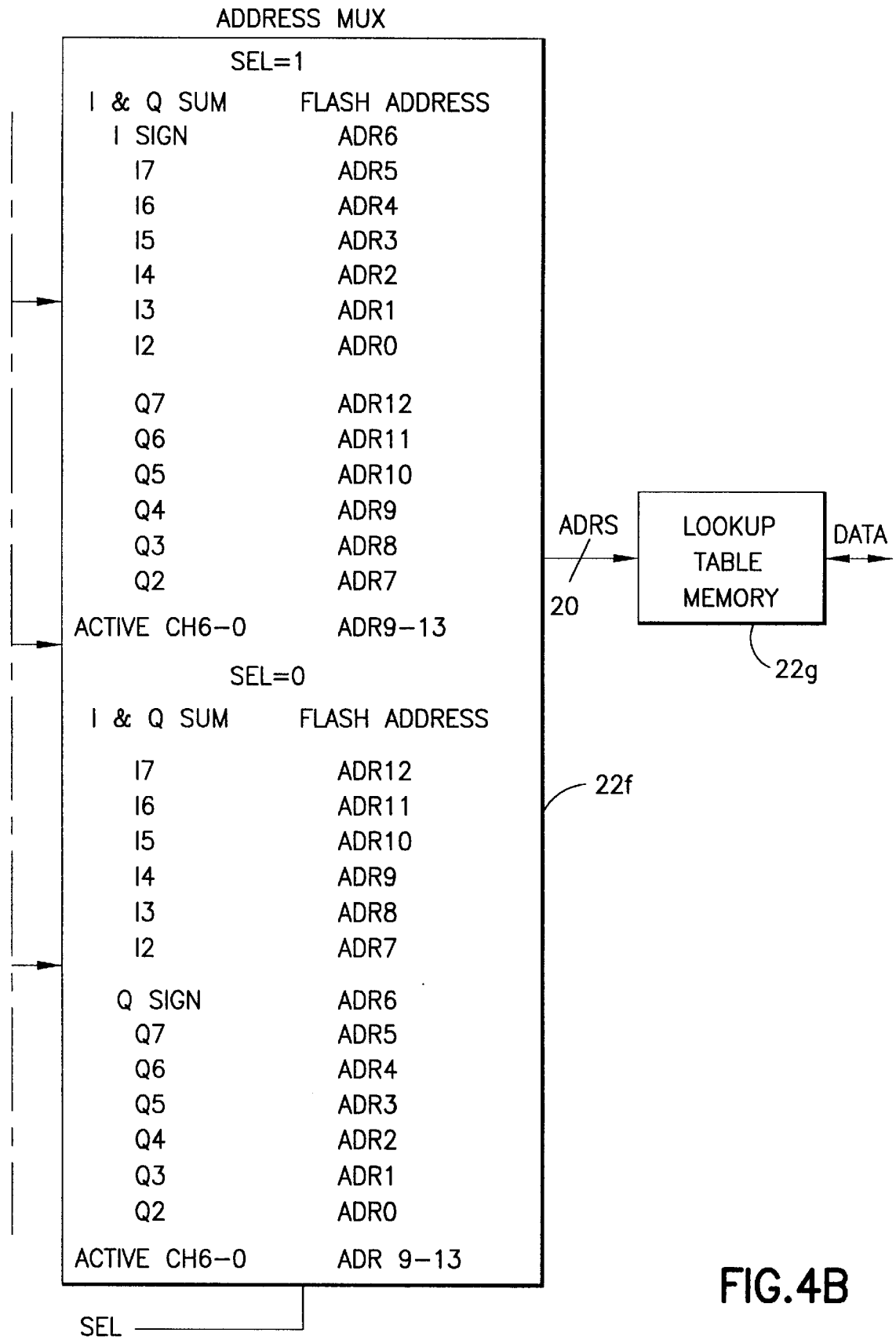
Figure 5:
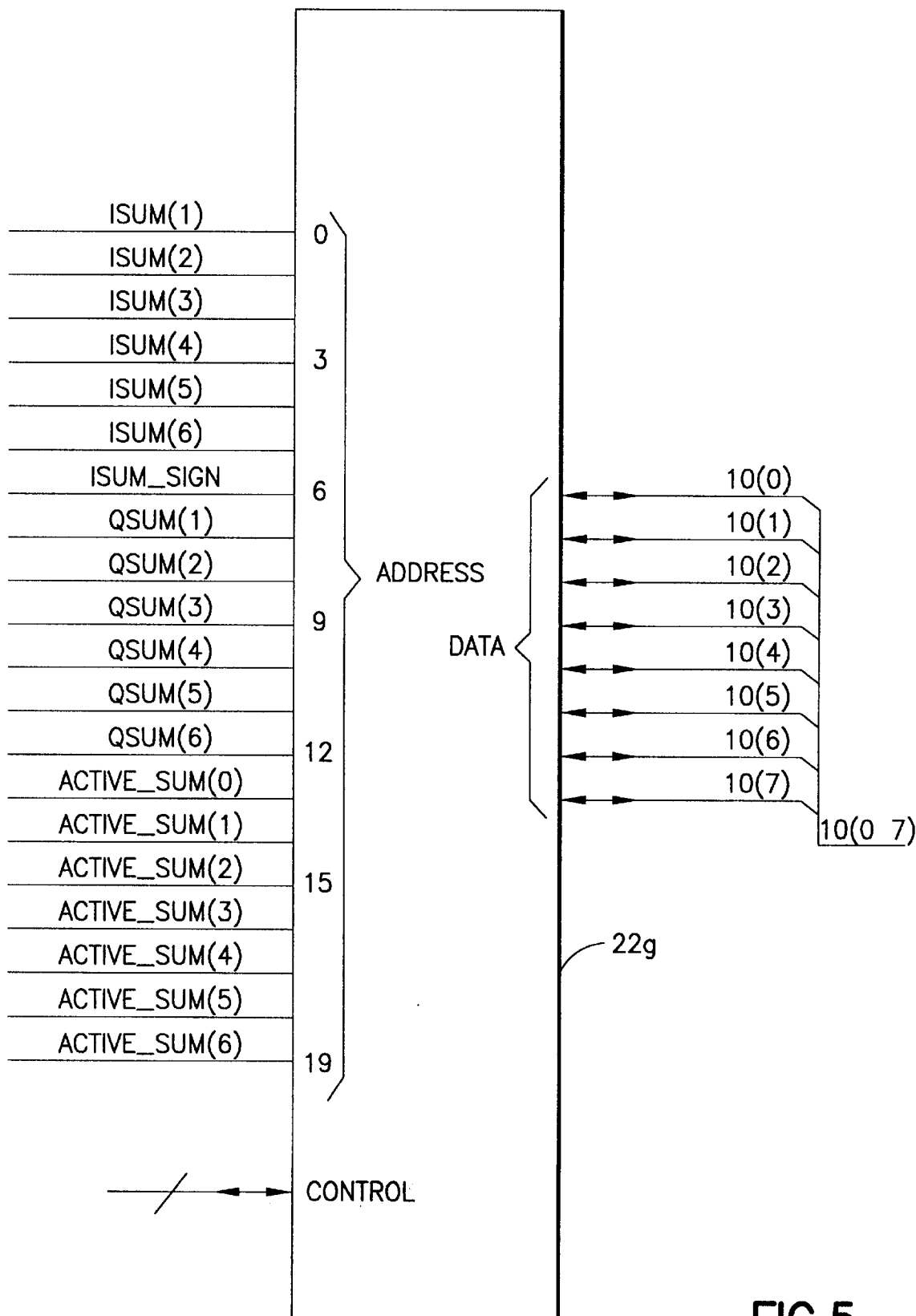
FIG. 5 illustrates the lookup table memory of FIG. 4 in greater detail, wherein individual memory control signals (chip enable, write enable, output enable, reset and busy) are not shown to simplify the drawing.

The RBU BBC 22 of FIG. 3 includes, in accordance with this invention, an improved predistortion lookup table memory 22g and associated circuitry, as shown in FIGS. 4 and 5. It is assumed that the user signals have been previously convolutionally encoded and spread using appropriate pseudonoise (pn) spreading codes. A simplified convolutional encoder 22h and spreader 22i are shown in FIG. 4.

More particularly, in the preferred embodiment of this invention an Inphase (I) channel 2's complement adder (I Summer) 22a has inputs coupled to the I channel signals of channels 1–128 and a Quadrature (Q) channel 2's complement adder (Q Summer) 22b has inputs coupled to the Q channel signals of channels 1–128. Each channel contributes a signal of ±1. In practice, the 128th channel corresponds to a null pn code (i.e., a code that is not transmitted), so the maximum number of active forward channels is 127. An Active channel summer 22c provides a 7-bit output for indicating a total number of active channels. The 8-bit output of the I Summer 22a and the Q Summer 22b are each applied to a respective 2's complement to 1's complement (signed) logic block 22d and 22e, respectively, each of which outputs an 8-bit value (7-bits of magnitude (I2–I7 or Q2–Q7) and one sign bit (I sign or Q sign)) to inputs of an address multiplexer 22f. The 7-bit active channel sum is also applied to inputs of the address multiplexer 22f. The 20-bit output of the address multiplexer 22f forms the 20-bit address (A0–A19) for the 1048K×8-bit lookup table memory 22g (see FIG. 5) and is controlled by the state of a select (SEL) signal, as shown in FIG. 4. That is, when SEL is a one (high), address bit 0 (adr0) assumes the value of I2, adr1 assumes the value of I3, . . . , adr6 assumes the value of I sign, adr7 assumes the value of Q2, adr8 assumes the value of Q3, . . . , adr12 assumes the value of Q7, and adr19–13 assume the value of Active Channel 6-0. When SEL is a zero (low), adr0 assumes the value of Q2, adr1 assumes the value of Q3, . . . , adr6 assumes the value of Q sign, adr7 assumes the value of I2, adr8 assumes the value of I3, . . . , adr12 assumes the value of I7, and adr19-13 assume the value of Active Channel 6-0. The state of the SEL input is toggled at the sub-chip rate (i.e., at two times the chip rate). The lookup table memory 22g outputs an 8-bit value based on the magnitude of Q, the value of I, and the number of active channels. The output of the memory 22g thus reflects whether clipping is necessary and, if so, how much clipping is required to maintain the distortion of the transmitted signal below a predetermined maximum value. The 8-bit value output from the lookup table memory 22g is applied to the D/A converter 24 and thereafter to the transmit RFFE 26 for transmission from the antenna 12b to the SUs 14.

As was noted earlier, in a CDMA system with multiple transmission channels, the I and Q signals for multiple channels are summed together. To reduce power requirements, it is known that the sum can be smoothly distorted and/or clipped by means of a lookup table.

In accordance with the teachings of this invention, the inputs (address bits) to the lookup table memory 22g are N (number of active channels), Isum, and Qsum. Since Isum and Qsum are multiplexed onto the address bits, only one quantity need be output at a time. Furthermore, the least significant bit of Isum and Qsum is derived from the least significant bit of N (the number of active channels). The sign of Qsum is not needed to output Isum, and the reverse is true. If Isum and Qsum are processed as signed magnitude quantities, the sign bit may be kept external to the lookup table memory 22g. The total possible savings is thus four bits of address input, and half of the output bits plus one.

The teaching of this invention thus provides a technique to provide a smooth predistortion and/or clipping of the transmitted signal, with minimal lookup table memory resource requirements.

Figure 6:
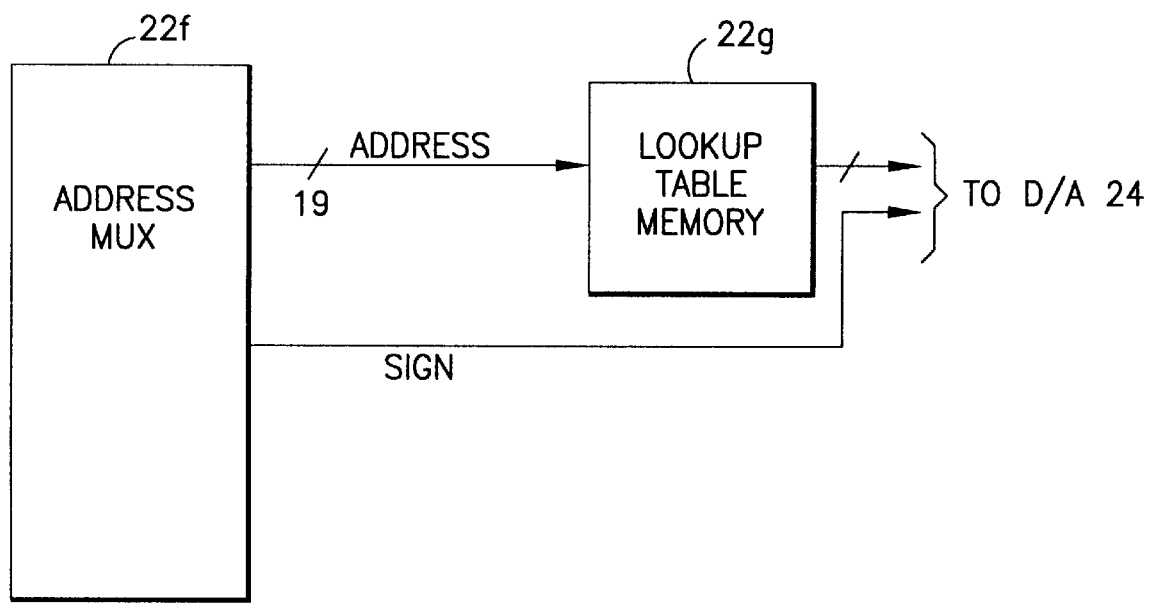
FIG. 6 illustrates a further embodiment of the lookup table memory, wherein a sign bit is external to the look-up table memory.

The teaching of this invention further reduces lookup table memory requirements by time multiplexing the I and Q data at the sub-chip rate, and deriving certain bits of the input based on other bits. Optionally the sign bit can be kept external to the look-up table memory 22g for further memory savings, as shown in FIG. 6.

This method reduces by up to 4 bits the address input requirements for the lookup table memory 22g, thus correspondingly reducing the memory device capacity requirement to as much as 1/16th of that required in conventional systems. The time multiplexing of Isum and Qsum reduces the output bit requirements by ½ (for example allowing the use of the 8-bit memory device instead of a 16-bit memory device). An additional bit of memory output can be saved by keeping the sign bit external to the memory device.

The lookup table memory 22g may be a read/write device enabling the contents to be generated and stored at RBU initialization. The use of a high speed flash-type memory is desirable, although not required if the access times are compatible with the subchip rate at which the address is multiplexed.

A suitable algorithm for calculating the memory contents is given below.

```
MEM_ACCESS( ); /*  Disable BBC 22 summing; allow flash
                   memory access */
bbc_mem_erase( );
membase =   (u_short *) (u_long) (bbc→card.cca) +
            BBC_MEM_BASE);
for (N=0; N<MAXCHANNELS;N++) {
    for(count=0;<BBC_MEM_SIZE/MAXCHANNELS; count++) {
/ * The task converts input bits into N, Ivalue, and
Qvalue: */
/ * N = (int)((count & 0xfe000L)>>13); */
/ * 7 bits N * /
#if FIRSTMEM
/ *  Address expressed as bits NNNNNNNQQQQQQSIIIIII
     where: S is sign bit * /
     / * 7 most significant bits of I input * /
     Ivalue=(((unsigned short)count & 0x3f)<<1) | (N &
     0x0001);
     / * 7 most significant bits of Q input * /
     Qvalue=(((unsigned short) count & 0x1f80)>>6) | (N &
     0x0001);
/ * 3f and 1f80 each mask 6 bits, N & 0x0001 is LSB of
active users that is ORed in to provide I and Q value LSB,
Note that the scaling of I depends on the sign of Q, not
the magnitude of Q * /
        if   (count & 0x0040) {
             Ivalue = -Ivalue;
        )
#else
/ *  in other embodiment address bits are
     NNNNNNNQQQQQIIIIIIII, I and Q 2's complement * /
     / * 8 bits of I input * /
     Ivalue=((unsigned short) count & 0xff);
     / * 5 most significant bits of Q input * /
     Qvalue=((unsigned short) count & 0x1f00)>>5;
     / * first, convert to 2's complement equivalent as
     short * /
     if (Ivalue >= 0x80) Ivalue -= 0x100;
     if (Qvalue >= 0x80) Qvalue -= 0x100;
#endif
```

The second embodiment disclosed in the code provides a rough estimate of Q, and is not presently preferred.

The end result is that I is scaled and clipped, and the amount of clipping of I depends on the magnitude of Q.

While disclosed in the context of the use of 2's complement adders 22a and 22b, other adder types can be used. Also, other numbers of users, numbers of bits of resolution and the like can be employed, and the teaching of this invention is thus not limited to only the specific examples given above.

As such, while the invention has been particularly shown and described with respect to preferred embodiments thereof, it will be understood by those skilled in the art that changes in form and details may be made therein without departing from the scope and spirit of the invention.

What is claimed is:

1. A method for generating I/Q waveforms for transmission over a CDMA radio channel, comprising steps of:

summing, for each of a plurality N of channels, the state of I bits to form an Isum value having a sign bit, the state of Q bits to form a Qsum value having a sign bit, and a total number of active channels to form a channel sum value;

applying bits representing the Isum value and sign bit, the Qsum value and sign bit, and the channel sum value as inputs to a multiplexer;

time multiplexing the multiplexer inputs to generate first and second sets of output bits, the first set of output bits including a subset of bits of the Isum value, a subset of bits of the Qsum value, the I sign bit, and bits of the channel sum value, the second set of output bits including the subset of the bits of the Isum value, the subset of the bits of the Qsum value, the Q sign bit, and the bits of the channel sum value; and sequentially applying the first and second sets of output bits to a lookup table memory device for sequentially outputting an Ivalue and a Qvalue for application to a digital to analog converter for generating I/Q waveforms that are predetermined to reduce transmission power and distortion, the lookup table memory device using the LSB of the channel sum value as the LSB of the Ivalue and the LSB of the Qvalue.

2. The method as in claim 1, wherein the step of time multiplexing operates at a subchip rate.

3. The method as in claim 1, wherein the I bits and the Q bits represent data to be transmitted to users over the active channels, the data being first convolutionally encoded and spread over an available bandwidth using at least one spreading code.

4. A method for generating I/Q waveforms for transmission over a CDMA radio channel, comprising steps of:

summing, for each of a plurality N of channels, the state of I bits to form an Isum value having a sign bit, the state of Q bits to form a Qsum value having a sign bit, and a total number of active channels to form a channel sum value;

applying bits representing the Isum value and sign bit, the Qsum value and sign bit, and the channel sum value as inputs to a multiplexer;

time multiplexing the multiplexer inputs to generate first and second sets of output bits, the first set of output bits including a subset of bits of the Isum value, a subset of bits of the Qsum value, and bits of the channel sum value, the second set of output bits including the subset of the bits of the Isum value, the subset of the bits of the Qsum value, and the bits of the channel sum value; and sequentially applying the first and second sets of output bits to a lookup table memory device for sequentially outputting an Ivalue and a Qvalue for application to a digital to analog converter for generating I/Q waveforms that are predetermined to reduce transmission power and distortion, the lookup table memory device using the LSB of the channel sum value as the LSB of the Ivalue and the LSB of the Qvalue; wherein the I sum value sign bit and the Q sum value sign bit are applied directly from the output of the multiplexer to the output of the lookup table memory device.

5. The method as in claim 4, wherein the step of time multiplexing operates at a subchip rate.

6. A synchronous CDMA fixed wireless system comprised of a radio base unit RBU coupled to a telecommunications network and to a plurality of subscriber units SUs that communicate over CDMA radio channels using I/Q waveforms, said RBU comprising:

summing means, for each of N channels, for summing the state of I bits to form an Isum value having a sign bit, for summing the state of Q bits to form a Qsum value having a sign bit, and for summing a total number of active channels to form a channel sum value;

a multiplexer having inputs coupled to an output of said summing means for receiving bits representing the Isum value and sign bit, the Qsum value and sign bit, and the channel sum value, said multiplexer being controlled for time multiplexing the inputs at a subchip rate to generate first and second sets of output bits, the first set of output bits including a subset of bits of the Isum value, a subset of bits of the Qsum value, the I sign bit, and bits of the channel sum value, the second set of output bits including the subset of the bits of the Isum value, the subset of the bits of the Qsum value, the Q sign bit, and the bits of the channel sum value; and a lookup table memory device having address inputs coupled to said output bits of said multiplexer, said multiplexer sequentially applying the first and second sets of output bits to said address inputs of said lookup table memory device which responds by sequentially outputting an Ivalue and a Qvalue for application to a digital to analog converter for generating I/Q waveforms that are predetermined to reduce transmission power and distortion, wherein the lookup table memory device uses the LSB of the channel sum value as the LSB of the Ivalue and the LSB of the Qvalue.

7. The system as in claim 6, wherein said RBU further comprises means for convolutionally encoding and spreading data received from said telecommunications network prior to applying the I bits and the Q bits to said summing means.

8. A method for generating waveforms for transmission over a radio channel of a synchronous CDMA wireless system, comprising steps of:

for a plurality of subscribers, providing data to be transmitted over a plurality of channels, the data being first encoded and spread and being arranged as Inphase I bits and Quadrature Q bits;

summing, for each of the plurality of channels, the I bits to form an Isum value having an Isum sign bit, the Q bits to form a Qsum value having a Qsum sign bit, and a total number of active channels to form a channel sum value;

applying bits representing at least the Isum value and Isum sign bit, the Qsum value and Qsum sign bit, and the channel sum value as inputs to a multiplexer;

operating the multiplexer at a subchip rate in order to time multiplex the multiplexer inputs to generate a first set of output bits and a second set of output bits, the first set of output bits comprising a subset of bits of the Isum value, a subset of bits of the Qsum value, and bits of the channel sum value, the second set of output bits comprising the subset of the bits of the Isum value, the subset of the bits of the Qsum value, and the bits of the channel sum value; and sequentially applying the first and second sets of output bits as addressing bits to a lookup table memory device for sequentially outputting an Ivalue and a Qvalue for application to a digital to analog converter for generating transmission waveforms, wherein the lookup table memory device uses the LSB of the channel sum value as the LSB of the Ivalue and the LSB of the Qvalue.

9. The method as in claim 8, wherein the first set of output bits further comprise the Isum sign bit and the second set of output bits further comprise the Qsum sign bit; and wherein the step of sequentially applying also sequentially applies the Isum sign bit and the Qsum sign bit to the lookup table memory device.

10. The method as in claim 8, wherein the first set of output bits further comprises the Isum sign bit and the second set of output bits further comprises the Qsum sign bit; and wherein the step of sequentially applying bypasses the Isum sign bit and the Qsum sign bit around the lookup table memory device and applies the Isum sign bit and the Qsum sign bit to the digital to analog converter.

* * * * *